(12) United States Patent
Julson et al.

(10) Patent No.: US 8,880,277 B2
(45) Date of Patent: Nov. 4, 2014

(54) METHODS AND SYSTEMS FOR DIAGNOSING A VEHICLE

(71) Applicant: GM Global Technology Operations LLC, Detroit, MI (US)

(72) Inventors: Timothy D. Julson, Rochester Hills, MI (US); Gary W. Taraski, Oxford, MI (US); Thomas M. P. Catsburg, Rochester, MI (US); Kimberley R. Will, Macomb Township, MI (US); Khara D. Pratt, Redford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 29 days.

(21) Appl. No.: 13/749,380

(22) Filed: Jan. 24, 2013

(65) Prior Publication Data

US 2013/0226393 A1 Aug. 29, 2013

Related U.S. Application Data

(60) Provisional application No. 61/605,020, filed on Feb. 29, 2012.

(51) Int. Cl.
  *G01M 17/00* (2006.01)
  *G07C 5/08* (2006.01)
  *G06F 17/00* (2006.01)

(52) U.S. Cl.
  CPC .............. *G06F 17/00* (2013.01); *G07C 5/0808* (2013.01)
  USPC .......................... 701/29.6; 701/29.1; 701/33.1

(58) Field of Classification Search
  USPC ....................... 701/29.1, 29.6, 33.1
  See application file for complete search history.

(56) References Cited

U.S. PATENT DOCUMENTS

| | | | |
|---|---|---|---|
| 7,095,748 B2 * | 8/2006 | Vij et al. | 370/401 |
| 2004/0039646 A1 * | 2/2004 | Hacker | 705/22 |
| 2006/0271248 A1 * | 11/2006 | Cosgrove et al. | 701/2 |
| 2008/0042875 A1 * | 2/2008 | Harrington et al. | 340/870.19 |
| 2012/0099478 A1 * | 4/2012 | Fu et al. | 370/254 |
| 2013/0117739 A1 * | 5/2013 | Mueller et al. | 717/169 |

* cited by examiner

*Primary Examiner* — Hussein A. Elchanti
(74) *Attorney, Agent, or Firm* — Ingrassia Fisher & Lorenz, P.C.

(57) ABSTRACT

Methods and apparatus are provided for generating a vehicle specific configuration file. The method includes: determining a vehicle identification number; retrieving, based on the vehicle identification number, from at least one data storage device a bus topology, module information, at least one message identification number, and at least one message length; and generating a configuration file based on the vehicle identification number, the bus topology, the module information, the at least one message identification number, and the at least one message length.

20 Claims, 3 Drawing Sheets

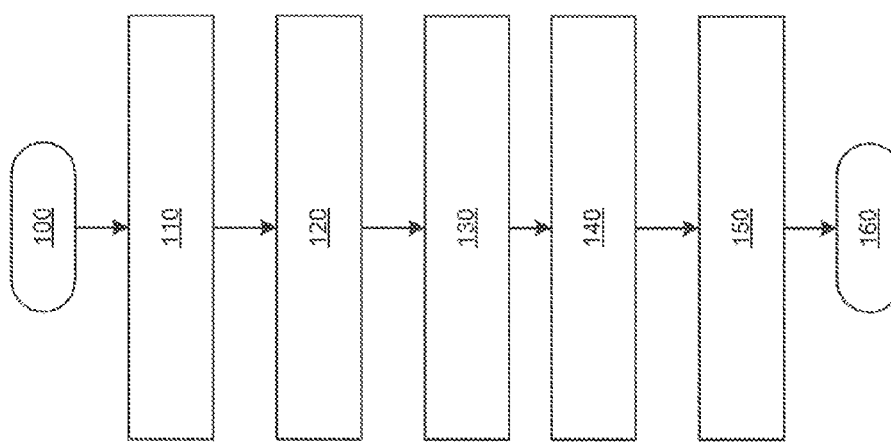

METHODS AND SYSTEMS FOR DIAGNOSING A VEHICLE

CROSS-REFERENCE TO RELATED APPLICATIONS

This application claims the benefit of U.S. Provisional Patent Application No. 61/605,020 filed Feb. 29, 2012, the entire contents of which are herein incorporated by reference.

TECHNICAL FIELD

The present disclosure generally relates to methods and systems for diagnosing a vehicle, and more particularly relates to methods and systems for diagnosing faults in an electrical system of a vehicle.

BACKGROUND

Vehicle technician tools connect to a vehicle's communication system to monitor and retrieve data from the vehicle. The technician tools are most commonly used to aid the technician in diagnosing problems of the vehicle. For example, diagnostic trouble codes can be retrieved from the vehicle's communication system through the technician tool. Due to the large variation in vehicle configurations, a technician must follow through a service diagnostic tree to retrieve the code and determine the fault. Such a method can be time consuming and error prone.

Accordingly, it is desirable to provide methods and systems for automatically configuring the technician tool for a specific vehicle. Furthermore, other desirable features and characteristics of the present disclosure will become apparent from the subsequent detailed description and the appended claims, taken in conjunction with the accompanying drawings and the foregoing technical field and background.

SUMMARY

Methods are provided for generating a vehicle specific configuration file. In one embodiment, a method includes: determining a vehicle identification number; retrieving, based on the vehicle identification number, from at least one data storage device a bus topology, module information, at least one message identification number, and at least one message length; and generating a configuration file based on the vehicle identification number, the bus topology, the module information, the at least one message identification number, and the at least one message length.

In another embodiment, a system is provided for generating a vehicle specific configuration file. The system includes a first module that determines a vehicle identification number. A second module retrieves, based on the vehicle identification number, from at least one data storage device a bus topology, module information, at least one message identification number, and at least one message length. A third module that generates a configuration file based on the vehicle identification number, the bus topology, the module information, the at least one message identification number, and the at least one message length.

In still another embodiment, a diagnostic system is provided for a vehicle. The diagnostic system includes a configuration module that determines a vehicle identification number, that retrieves, based on the vehicle identification number, from at least one data storage device a bus topology, module information, at least one message identification number, and at least one message length, and that generates a configuration file based on the vehicle identification number, the bus topology, the module information, the at least one message identification number, and the at least one message length. A diagnostic module diagnoses a fault of a vehicle using the configuration file.

DESCRIPTION OF THE DRAWINGS

The present disclosure will hereinafter be described in conjunction with the following figures, wherein like numerals denote like elements, and:

FIG. 3 is a flowchart illustrating a configuration method of the vehicle diagnostic system in accordance with exemplary embodiments.

DETAILED DESCRIPTION

Figure 1:
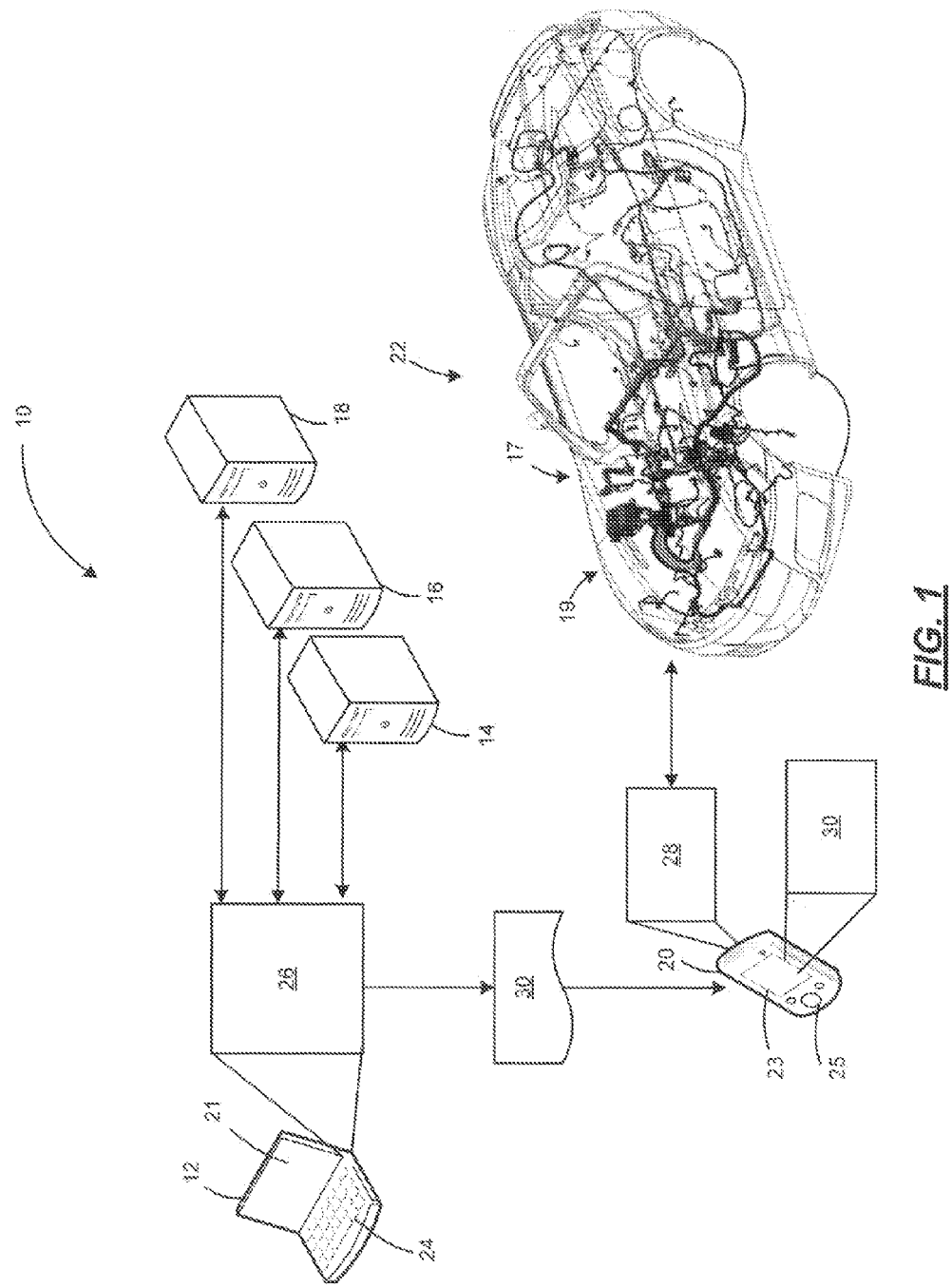
FIG. 1 is a functional block diagram illustrating a vehicle diagnostic system in accordance with an exemplary embodiment.

The following detailed description is merely exemplary in nature and is not intended to limit the disclosure or its application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, a vehicle diagnostic system 10 is shown to include a computer 12 communicatively associated with one or more data storage devices 14-18, and a technician tool 20 that is communicatively associated with a vehicle 22. The vehicle 22 includes one or more control modules 17 that are communicatively coupled via a vehicle bus 19. Although the figures shown herein depict an example with certain arrangements of elements, additional intervening elements, devices, features, or components may be present in an actual embodiments. It should also be understood that FIG. 1 is merely illustrative and may not be drawn to scale.

As can be appreciated, the computer 12, the data storage devices 14-18, and the technician tool 20 can be implemented as multiple computing devices (as shown), as a single computing device (not shown), or in various combinations of computing devices. Each of the computing devices 12-20 includes a processor and one or more memory devices. The processor can be any custom made or commercially available processor, a central processing unit, an auxiliary processor among several processors associated with the computer, a semiconductor based microprocessor, a macroprocessor, or generally any device for executing instructions. The one or more memory devices can be at least one of the random access memory, read only memory, a cash, a stack, or the like which may temporarily or permanently store electronic data.

As shown in FIG. 1, the computer 12 is shown as a laptop computer, the data storage devices 14-18 are shown as servers, and the technician tool 20 is shown as a handheld device. As can be appreciated, the computer 12, the data storage devices 14-18, and the technician tool 20 are not limited to the present example and can include any computing devices including, but are not limited to, desktop computers, laptops, workstations, portable handheld devices, or any devices that include a processor and one or more memory devices.

As shown, the computer 12 and the technician tool 20 are each associated with a display device 21 and 23 respectively and one or more input devices 24 and 25 respectively that may be used by a user to communicate with the computer 12 and technician tool 20. As can be appreciated, such input devices 24, 25 may include, but are not limited to, a mouse, a keyboard, and a touchpad.

As will be discussed in more detail below, the computer 12 includes a configuration module 26, and the technician tool 12 includes a diagnostic module 28. The configuration module 26 generates a configuration file 30 that may be used by the diagnostic module 28 of the technician tool 20 to diagnose the vehicle 22. In various embodiments, when the computer 12 and the technician tool 20 are implemented as two separate computing devices, the configuration file 30 may be manually or automatically downloaded from the computer 12 and uploaded to the technician tool 20. In various other embodiments, when the computer 12 and the technician tool 20 are implemented as two separate computing devices, the configuration file 30 may be transmitted (e.g., according to a wired or wireless communication protocol) from the computer 12 to the technician tool 20. In various other embodiments, when the computer 12 and the technician tool 20 are implemented as the same computing device (i.e., the configuration module 26 and the diagnostic module 28 reside on the same computing device), the configuration file 30 may be saved by the configuration module 26 to a specific location in the memory device and retrieved by the diagnostic module 28 from the specific location in the memory device.

The configuration file 30 is a vehicle specific configuration file that is generated, for example, based on a vehicle identification number (VIN). The VIN can be entered manually, for example, based on a user interacting with one or more of the input devices 24, or entered automatically, for example, from a file (not shown) containing a listing of VINs.

To generate the configuration file 30, the configuration module 26 retrieves from the data storage devices 14-18 information associated with the VIN, and assembles information including, but not limited to a bus topology of the vehicle 22, a length between control modules 17 of the vehicle 22, and an identification number for the most frequent unique message sent by each control module 17 and a corresponding length for each unique message. For example, the data storage devices 14-18 can include, but are not limited to, a customer care after sales (CCA) database that stores VIN information, a global parts description (GPDS) database that stores part information for each VIN, and a time-domain reflectometry (TDR) database that stores information for performing tests on electrical systems of the vehicle 22 using a time-domain reflectometer. The configuration module 26 interfaces (e.g., by generating retrieval commands) with each of the data storage devices 14-18 to retrieve the needed information. The configuration module 26 formats the information such that it can be read by the diagnostic module 28 of the technician tool 20.

When loaded onto the technician tool 20, the diagnostic module 28 reads the configuration file 30 to determine the information, including, but not limited to, a bus topology of the vehicle 22, a length between control modules 17 of the vehicle 22, and an identification number for the most frequent unique message sent by each control module 17 and a corresponding length for each unique message. When the technician tool 20 is communicatively coupled to the vehicle 22 (either directly or indirectly), the diagnostic module 28 automatically (i.e., without configuration by a technician) monitors the communication bus 19 of the vehicle 22 to determine any faults. For example, the diagnostic module 28 listens to the communication bus 19, measures a time to fault, and predicts a fault location based on the time. The diagnostic module 28 may predict a location of the fault and may display the location on the technician tool 20. For example, based on the bus topology and the length between control modules 17, a vehicle map is graphically illustrated in a user interface 30 on the display and a location of the fault is displayed relative to the vehicle map. The vehicle map is illustrated such that an entire electrical topology or architecture of control modules 17 and interconnected wiring within the particular vehicle 22 is presented to the technician in either two-dimensional (2D) or three-dimensional (3D) form thus, allowing a technician to easily associate the fault location with an actual location in the vehicle 22.

Figure 2:
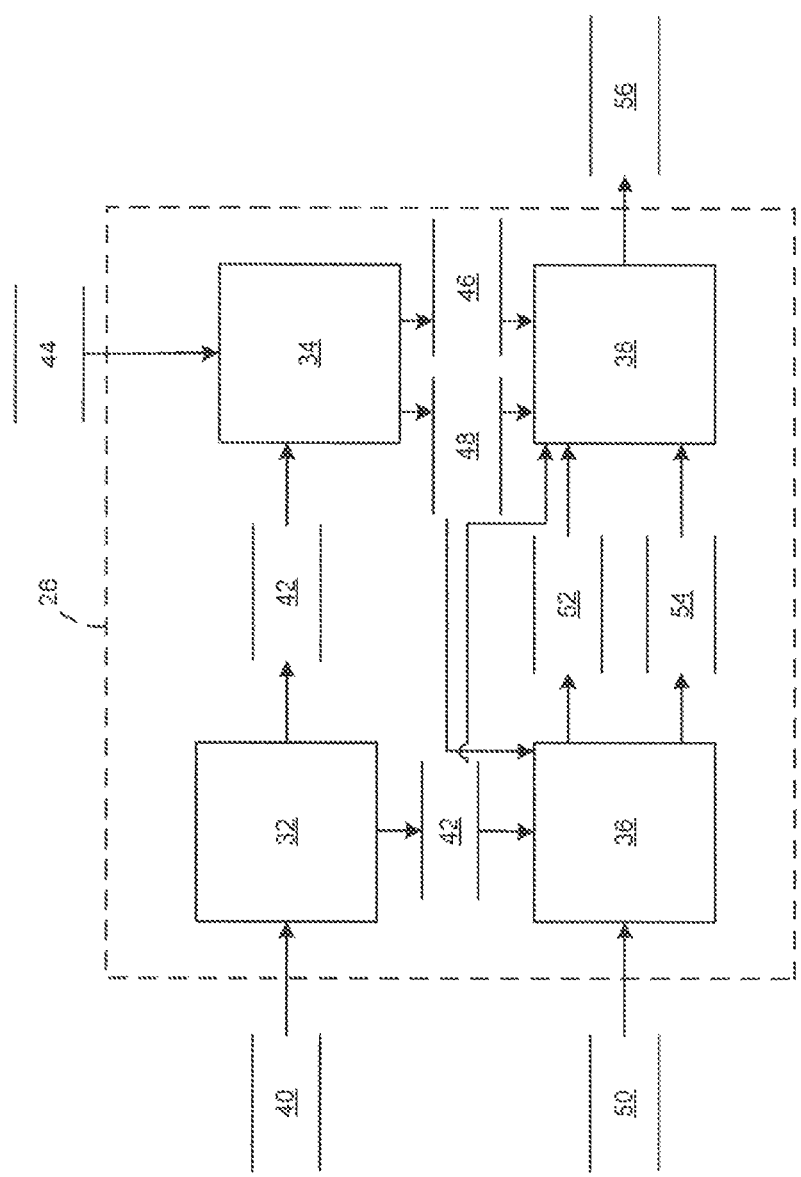
FIG. 2 is a dataflow diagram illustrating a configuration module of the vehicle diagnostic system in accordance with exemplary embodiments.

Referring now to FIG. 2, a dataflow diagram illustrates various embodiments of the configuration module 26 for the vehicle diagnostic system. Various embodiments of configuration modules 26 according to the present disclosure may include any number of sub-modules. As can be appreciated, the sub-modules shown in FIG. 2 may be combined and/or further partitioned to similarly generate a configuration file 30 (FIG. 1). Inputs to the configuration module 26 may be received from user input, retrieved from a file, and/or retrieved from the data storage devices 14-18 (FIG. 1). In various embodiments, the configuration module 26 includes a VIN identification module 32, a bus information module 34, a message information module 36, and an output module 38.

The VIN identification module 32 receives as input user input 40. The user input 40 indicates a request to generate the configuration file 30 for a particular VIN 42. The user input 40 can include a particular VIN 42 or the VIN identification module 32 can retrieve the VIN 42 from the data storage devices 14-18 (e.g., the CCA database).

The bus information module 34 receives as input the VIN 42. Based on the VIN 42, the bus information module 34 retrieves from one or more of the data storage devices 14-18 (e.g., the GPDS database) bus information 44 and determines a bus topology 46 and module information 48 including a number of control modules 17 (FIG. 1) and a length between control modules 17 (FIG. 1). For example, the bus information module 34 retrieves point to point connection information by circuit number from a collection of vehicle wiring harnesses, sorts out only those wires in the circuit of interest, and constructs the bus topology of the circuit in the vehicle 22 (FIG. 1) from control module to control module based on the individual wires.

The message information module 36 receives as input the VIN 42 and the module information 48. Based on the VIN 42 and the module information 48, the message information module 36 retrieves message information 50 from one of more of the data storage devices 14-18 (FIG. 1) and provides an ID for a most frequent unique message 52 sent by each control module 17 (FIG. 1) and a length 54 of each most frequent unique message.

The output module 38 receives as input the VIN 42, the module information 48, the message IDs 52, and the message lengths 54. The output module 38 formats the input data such that it can be read by a particular diagnostic module 28 (FIG. 1). The output module 38 generates configuration file data 56 to form the configuration file 30 (FIG. 1) based on the formatted data. In various embodiments, the output module 38 may format the input data based on a predetermined format and/or may further receive as input user input indicating a particular format to be used when generating the configuration file 30 (FIG. 1).

Referring now to FIG. 3, and with continued reference to FIGS. 1 and 2, a flowchart illustrates a configuration method that can be performed by the configuration module 26 of FIGS. 1 and 2 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure.

In one example, the method may begin at 100. The VIN 42 is determined at 110. Based on the VIN 42, the bus topology 46 and module information 48 is retrieved at 120. Further based on the VIN 42 and the module information 48, the message IDs 52 and message lengths 54 are retrieved at 130. The information is formatted at 140. The configuration file 30 is generated based on the formatted information at 150. Thereafter, the method may end at 160.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of generating a vehicle specific configuration file, comprising:
   determining a vehicle identification number;
   retrieving, by a processor, based on the vehicle identification number, from at least one data storage device a bus topology, module information, at least one message identification number, and at least one message length; and
   generating, by the processor, a configuration file based on the vehicle identification number, the bus topology, the module information, the at least one message identification number, and the at least one message length.

2. The method of claim 1, further comprising diagnosing a fault of a vehicle using the configuration file.

3. The method of claim 2, further comprising generating a graphical user interface that displays a vehicle map of the vehicle and a fault location relative to the vehicle map based on the configuration file and the fault of the vehicle.

4. The method of claim 3, wherein the graphical user interface is a two dimensional graphical user interface.

5. The method of claim 3, wherein the graphical user interface is a three dimensional graphical user interface.

6. The method of claim 1, wherein the generating the configuration file comprises formatting the vehicle identification number, the bus topology, the module information, the at least one message identification number, and the at least one message length based on a predetermined format.

7. The method of claim 1, wherein the generating the configuration file comprises formatting the vehicle identification number, the bus topology, the module information, the at least one message identification number, and the at least one message length based on a user provided format.

8. A system for generating a vehicle specific configuration file, comprising:
   a non-transitory computer readable medium, comprising:
      a first module that determines a vehicle identification number;
      a second module that retrieves, based on the vehicle identification number, from at least one data storage device a bus topology, module information, at least one message identification number, and at least one message length; and
      a third module that generates a configuration file based on the vehicle identification number, the bus topology, the module information, the at least one message identification number, and the at least one message length.

9. The system of claim 8, further comprising a fourth module that diagnoses a fault of a vehicle using the configuration file.

10. The system of claim 9, wherein the fourth module generates a graphical user interface that displays a vehicle map of the vehicle and a fault location relative to the vehicle map based on the configuration file and the fault of the vehicle.

11. The system of claim 10, wherein the graphical user interface is a two dimensional graphical user interface.

12. The system of claim 10, wherein the graphical user interface is a three dimensional graphical user interface.

13. The system of claim 8, wherein the third module generates the configuration file by formatting the vehicle identification number, the bus topology, the module information, the at least one message identification number, and the at least one message length based on a predetermined format.

14. The system of claim 8, wherein the third module generates the configuration file by formatting the vehicle identification number, the bus topology, the module information, the at least one message identification number, and the at least one message length based on a user provided format.

15. A diagnostic system for a vehicle, comprising:
   a non-transitory computer readable medium, comprising:
      a configuration module that determines a vehicle identification number, that retrieves, based on the vehicle identification number, from at least one data storage device a bus topology, module information, at least one message identification number, and at least one message length, and that generates a configuration file based on the vehicle identification number, the bus topology, the module information, the at least one message identification number, and the at least one message length; and
      a diagnostic module that diagnoses a fault of a vehicle using the configuration file.

16. The system of claim 15, wherein the diagnostic module generates a graphical user interface that displays a vehicle map of the vehicle and a fault location relative to the vehicle map based on the configuration file and the fault of the vehicle.

17. The system of claim 16, wherein the graphical user interface is a two dimensional graphical user interface.

18. The system of claim 16, wherein the graphical user interface is a three dimensional graphical user interface.

19. The system of claim 15, wherein the configuration module generates the configuration file by formatting the vehicle identification number, the bus topology, the module information, the at least one message identification number, and the at least one message length based on a predetermined format.

20. The system of claim 15, wherein the configuration module generates the configuration file by formatting the vehicle identification number, the bus topology, the module information, the at least one message identification number, and the at least one message length based on a user provided format.

\* \* \* \* \*